United States Patent Office 2,890,127
Patented June 9, 1959

2,890,127

METHOD OF MAKING CELLULAR SILICA

Walter D. Ford, Port Allegany, Pa., assignor to Pittsburgh Corning Corporation, Allegheny County, Pa., a corporation of Pennsylvania No Drawing. Application April 11, 1957
Serial No. 652,099

20 Claims. (Cl. 106—40)

This invention relates to a method of making cellular silica bodies.

The present invention is an improvement over the methods disclosed and claimed in Ford application Serial No. 652,098, filed April 11, 1957, and Ford and Anderson application Serial No. 375,300, filed August 19, 1953. The present application is a continuation-in-part of a copending application of Walter D. Ford, Serial No. 556,093, filed December 29, 1955, now abandoned.

Satisfactory cellular silica has been made by the methods described in the foregoing applications from silica and carbonaceous material, but the procedures disclosed in my application Serial No. 290,567, now abandoned, require comparatively long periods of time for completion and the conditions must be carefully controlled to secure suitable cellulated ware. For these reasons the prior methods have been relatively expensive and somewhat difficult to carry out successfully on a commercial scale. The present method overcomes disadvantages of prior known methods and results in cellular silica products having more uniform properties. Cellular silica products having the following desirable properties are obtainable according to the present method:

(a) The cellular product is commercially pure silica.

(b) It has an essentially closed cell structure, i.e., at least 85% of the interior cells are non-communicating.

(c) It has a low density, it being possible to produce a product weighing 10 lbs. per cubic foot or less.

(d) It has high resistance to thermal shock. It will not shatter, break, or spall when heated to a temperature of 2000° F. and plunged into water at room temperature.

(e) Its thermal conductivity is low. It has a thermal conductivity at 50° F. of 0.46 or lower, the thermal conductivity being defined as the heat conducted through the cellulated silica, measured in B.t.u. per hour per square foot per inch thickness, per degree F. temperature difference. It has correspondingly low thermal conductivity when measured at other temperatures, such as, 100° F., 500° F. and 900° F.

(f) It has high chemical durability, by which is meant that it is highly resistant to attack by water or water vapor and most acids. In carrying out the present invention, the following batch is employed:

TABLE 1

| | Parts by weight |
|---|---|
| (a) Commercially pure silica (quartz sand) | 100 |
| (b) High $K_2O$ feldspar | 2.0–4.5 |
| (c) Cellulating agent (carbon black) | 0.05–0.25 |
| (d) Calcine | 0.02–4.0 |

A typical analysis of the high potash feldspar used in the batch is:

TABLE 2

| | |
|---|---|
| $SiO_2$ | 68.5 |
| $Al_2O_3$ | 17.5 |
| $Fe_2O_3$ | 0.09 |
| CaO | 0.1 |
| MgO | Trace |
| $Na_2O$ | 3.2 |
| $K_2O$ | 10.4 |

There are several known types of feldspar, these being high $Na_2O$ feldspar, for example, albite; high $K_2O$ feldspars such as orthoclase and microcline; and high CaO feldspar, for example, anorthite. By "high $K_2O$ feldspar" is meant feldspar having a greater amount by weight of $K_2O$ than the sum of $Na_2O$ and CaO, and preferably wherein the amount of $K_2O$ is at least about 10% of the weight of the feldspar. By "high $Na_2O$ feldspar" is meant feldspar having a greater amount by weight of $Na_2O$ than the sum of $K_2O$ and CaO. By "high CaO feldspar" is meant feldspar having a greater amount by weight of CaO than the sum of $K_2O$ and $Na_2O$. The feldspar designated as (b) in Table 1 is always a high $K_2O$ feldspar.

The cellulating agent ((c) of Table 1) is carbon black. By "carbon black" is meant a material deposited by incomplete combustion of natural gas, acetylene gas or petroleum oil. By "lampblack" is meant a material deposited by incomplete combustion of petroleum oil. Thus, "carbon black" is a generic term which includes lampblack.

The calcine ((d) of Table 1) is a product containing silicon carbide in very fine particle form. The calcine is made in the following manner.

Production of calcine

High $K_2O$ feldspar and carbon black (preferably having a particle size of about 1/10 micron or finer) in the proportions of 90 to 99 parts by weight of the feldspar and 1 to 10 parts by weight of the carbon black are ground together until the feldspar has been reduced to an average particle size of about 2 to 4 microns. The particle size was measured by the "Fisher Sub-Sieve Sizer." The "Fisher Sub-Sieve Sizer" is described on pages 148 and 149 of volume 23, Number 5 of "The Laboratory," published by Fisher Scientific Company of Pittsburgh, Pennsylvania. It measures average particle size by determining resistance to air flow of a weighed sample under standard packing conditions. The ground mixture is then placed in graphite trays or molds and heated in a furnace having a non-oxidizing or reducing atmosphere (e.g., nitrogen or argon) to a temperature and for a time sufficient to cause substantially all of the carbon black to react with a part of the silica of the feldspar and convert it into silicon carbide. A large part of the silica of the feldspar remains unconverted. The reaction between silica and carbon may be represented by the following equation:

(1)  $$SiO_2 + 3C \rightarrow SiC + 2CO$$

A preferred mixture of high $K_2O$ feldspar and carbon black contains 94 parts by weight of high $K_2O$ feldspar and 6 parts by weight of carbon black. If less than 6 parts of carbon black is used in the mixture to be calcined, the calcine will contain less silicon carbide and more of the calcine will be required in the batch of Table 1. If the mixture to be calcined contains more than 10 parts carbon black, some of the carbon black may not be converted into silicon carbide and in this case, the results produced by cellulating the batch of Table 1, as hereinafter described, are less satisfactory.

In carrying out Reaction 1 to form the calcine, it is preferred to heat the mixture at a temperature of about 2900° F. for about 30 to 45 minutes. The temperature employed, however, may be as low as 2600° F. and as high as but not substantially above 2920° F., a preferred range of temperature used in making the calcine being from about 2800 to 2900° F. By carrying out the calcining operation in accordance with Equation 1 at a temperature between 2600 and 2920° F. silicon carbide in very fine particle size is formed, the particle size being from about 1 to 10 millimicrons, a particle size not heretofore available and which, when used as a constituent of the batch of Table 1 which is to be cellulated, enables the rapid production of a more uniformly cellulated product. Furthermore, the silicon carbide in the calcine as produced by Reaction 1 is protected from surface oxidation by a glass matrix resulting from the conversion of the feldspar into a glass. The calcine, after cooling, is crushed to a particle size compatible for mixing with the other constituents of the batch as given in Table 1, for example, 15 to 20 mesh.

*Production of cellular silica*

The constituents in the proportions shown in Table 1 are ground together in a ball mill to an average particle size of 4 to 6 microns to form a mixture for use in the production of cellular silica. The mixture is then placed in graphite trays or molds and the mixture in the trays or molds passed through a furnace having a reducing or non-oxidizing atmosphere. The mixture is heated to a temperature and for a time sufficient to cause substantially all of the carbon black to react with a part of the silica to form silicon carbide but below that temperature at which the mixture softens appreciably. Thereafter, the mixture is heated to a higher temperature at which the silica softens and the particles thereof cohere into a very viscous plastic mass of vitreous silica which is impervious to gas and which contains fine particles of silicon carbide uniformly distributed throughout, and the silicon carbide reacts with the silica to produce gas, including silicon monoxide, which expands to form closed cells within the softened mass. Alternatively and preferably the cellulating step is carried out at a temperature range which is higher than that of the sintering step. After the softened cellular mass has been cellulated to the desired extent, it is cooled to form a rigid body.

Describing the heating steps more specifically, the mixture is first heated to a temperature up to but not exceeding about 2800° F. In heating the mixture up to about 2600° F. adsorbed gases are given off. Beginning at a temperature of about 2600° F. and extending up to a temperature of about 2800° F. the carbon black and quartz sand react to convert a small portion of the quartz sand into silicon carbide, and carbon monoxide is liberated from the mass which is still porous at this temperature and allows the escape of carbon monoxide from the mass (Equation 1). At about 2800° F. all of the carbon black has been converted into silicon carbide.

As the temperature of the batch increases above 2800° F. it reaches a level at which the particles of silica sinter to form a coherent vitreous mass. When the mass has attained a temperature of about 2900° F. the ground quartz sand, feldspar and calcine, previously in particle form, have softened and shrunk together, i.e., sintered into a vitreous mass which is impervious to gas.

The vitreous mass is finally exposed to a temperature of about 3250° F. Beginning at a temperature of about 2920° F., silicon carbide reacts with silica as shown by Equation 2

(2) $2SiO_2 + SiC \rightarrow 3SiO + CO$ to produce silicon monoxide gas and carbon monoxide gas and the gases expand and for the most part are entrapped within the vitreous mass, thereby producing a foamed product. It is preferred to heat the mass from 2900° F. up to about 3250° F. in a period of not over about 15 minutes as this has been found to produce maximum cellulation. The time required for cellulation is approximately one-half that required for the sintering step and generally is in the range of 40% to 60% of the sintering time.

The foaming mass is held at a temperature of about 3250° F. for a time sufficient to produce the desired extent of cellulation, preferably for a period of about 5 to 15 minutes, depending upon the thickness of the starting mixture. After the mass has been cellulated to the extent desired, it is removed from the furnace with the trays and cooled and the cellulated product is then removed from the trays.

As previously stated, a small amount (from 2.0 to 4.5%) of high $K_2O$ feldspar is employed in the batch to be cellulated. It has been found that this small amount of high $K_2O$ feldspar not only lowers the sintering and cellulating temperatures of the mass but, at the sintering and cellulating temperatures of the mass, the viscosity of high $K_2O$ feldspar is closer to the viscosity of silica than would be the viscosity of either high $Na_2O$ feldspar or high $CaO$ feldspar. Because the viscosity of high $K_2O$ feldspar is close to the viscosity of silica at the temperature at which the mass cellulates due to the reaction of silica and silicon carbide to form silicon monoxide and carbon monoxide gases (Equation 2), a more uniform cell structure is produced than if either a high $Na_2O$ feldspar or a high $CaO$ feldspar were employed.

Quartz sand is preferred as the main silica-containing constitutent of the batch because it can be obtained in relatively pure form. Other forms of silica, for example, flint, chalcedony and jasper may be used in place of quartz sand if they can be obtained in pure enough form.

As previously stated, the batch to be cellulated contains a small amount (0.02 to 4.0 parts per 100 parts of quartz sand) of previously separately formed calcine consisting of particles of silicon carbide of very fine particle size (1 to 10 millimicrons) dispersed in a high $K_2O$ feldspar glass matrix. The silicon carbide in the calcine acts as a seeding agent or starter which increases the rapidity of the reaction between the quartz sand and the carbon black (c) which results in the formation of silicon carbide (Equation 1). If the calcine were omitted from the batch, it would be necessary to hold the batch within the temperature range 2600° F. to 2800° F. for a longer period of time in order to form silicon carbide, thus slowing down the manufacture of cellular silica. Although the calcine is employed in the batch in only small amounts, it performs an important function.

The following examples further illustrate the method. It will be readily understood by those skilled in the art that numerous modifications in relative quantities of materials, temperatures, times and the like may be made without departing from the invention as disclosed in this application. The invention is not limited to the preferred embodiments but may be otherwise practiced within the scope of the appended claims.

EXAMPLE I

A calcine is prepared as follows: 94 parts by weight of high $K_2O$ feldspar having the composition given in Table 2 and 6 parts of lampblack having an average particle size of about 1/10 micron are ground in a ball mill until the average particle size of the feldspar has been reduced to about 4 microns. The ground mixture is then placed on a graphite tray and heated to 2900° F. and held at that temperature for 30 to 45 minutes in a reducing atmosphere. The reaction proceeds in accordance with Equation 1 to form silicon carbide of very small particle size embedded in a feldspar glass matrix. The calcine is cooled and crushed to 15–20 mesh size.

The following mixture as shown in Table 3 is ground in a ball mill to an average particle size of 4 to 6 microns.

TABLE 3

| | Parts by weight |
|---|---|
| Commercially pure quartz sand | 100 |
| High $K_2O$ feldspar | 3.32 |
| Lampblack | 0.12 |
| Calcine | 0.05 |

The feldspar is of the composition given in Table 2.
The batch is placed on graphite trays and passed through a furnace having a nitrogen atmosphere. The batch is heated to a temperature of about 2900° F. in a period of about 30 minutes. It is then raised to a temperature of about 3250° F. in a period of about 5 minutes and is maintained at that temperature for a period of about 10 minutes. The cellular plastic mass is then cooled to a rigid mass.

The product made according to this example is substantially pure cellular silica weighing about 10 lbs. per cubic foot (specific gravity=0.16) and has a thermal conductivity of about 0.46 at 50° F. The cellular product will not shatter, break, or spall when heated to a temperature of 2000° F. and plunged into water at room temperature. The product has an essentially closed cell structure, i.e., at least 85% of the interior cells are non-communicating. The cellular product is highly resistant to attack by water or water vapor and to all acids except hydrofluoric acid. It has a compressive strength of 125 lbs. per square inch, a tensile strength of 75 lbs. per square inch and a shear strength of 75 lbs. per square inch.

EXAMPLE II

A mixture of the following composition is ground in a ball mill to an average particle size of 4 to 6 microns:

TABLE 4

| | Parts by weight |
|---|---|
| Commercially pure quartz sand | 100 |
| High $K_2O$ feldspar | 3.32 |
| Lampblack | 0.12 |

The batch is placed in graphite trays and passed through a furnace having a nitrogen atmosphere. The batch is heated to a temperature of about 2900° F. in a period of about 40 minutes. It is then raised to a temperature of about 3250° F. in a period of about 10 minutes. The cellular plastic mass is then cooled to a rigid mass.

The product made according to this example is substantially pure cellular silica weighing about 11 lbs. per cubic foot (specific gravity=0.17) and has a thermal conductivity of about 0.46 at 50° F. The cellular product will not shatter, break, or spall when heated to a temperature of 2000° F. and plunged into water at room temperature. The product has an essentially closed cell structure, i.e., at least 85% of the interior cells are non-communicating. The cellular product is highly resistant to attack by water or water vapor and to all acids except hydrofluoric acid. It has a compressive strength of 125 lbs. per square inch, a tensile strength of 75 lbs. per square inch and a shear strength of 75 lbs. per square inch.

What is claimed as new and is desired to be secured by Letters Patent of the United States is:

1. A method of making a cellular silica body containing closed cells, which comprises making a calcine by heating an intimate pulverulent mixture of high $K_2O$ feldspar and carbon black in the proportions, by weight, of 90 to 99 parts of feldspar and 1 to 10 parts of carbon black at a temperature of about 2600° F. up to but not exceeding about 2920° F. for a time sufficient to cause substantially all of the carbon black to react with a part of the silica of the feldspar and convert it into silicon carbide, grinding together in the proportions, by weight, to form an intimate mixture, 100 parts commercially pure silica, from 2.0 to 4.5 parts high $K_2O$ feldspar, from 0.05 to 0.25 part carbon black and from 0.02 to 4.0 parts of said calcine, heating the mixture to a temperature and for a time sufficient to cause substantially all of the carbon black to react with a part of the silica to form silicon carbide but below that temperature at which the mixture softens appreciably, thereafter heating the mixture to a temperature at which it softens and the silicon carbide reacts with the silica to produce gas, including silicon monoxide, which expands to form closed cells within the softened mass, and then cooling the softened cellular mass to a rigid body.

2. A method of making a cellular silica body containing closed cells, which comprises making a calcine by heating an intimate pulverulent mixture of high $K_2O$ feldspar and carbon black in the proportions, by weight, of 90 to 99 parts of feldspar and 1 to 10 parts of carbon black at a temperature of about 2600° F. up to but not exceeding about 2920° F. for a time sufficient to cause substantially all of the carbon black to react with a part of the silica of the feldspar and convert it into silicon carbide, grinding together in the proportions, by weight, to form an intimate mixture, 100 parts commercially pure silica, from 2.0 to 4.5 parts high $K_2O$ feldspar, from 0.05 to 0.25 part carbon black and from 0.02 to 4.0 parts of said calcine, heating the mixture to a temperature of about 2600° F. up to but not exceeding about 2900° F. for a time sufficient to cause substantially all of the carbon black to react with a part of the silica to form silicon carbide, thereafter heating the mixture to a temperature above 2900° F. up to a temperature of about 3250° F. at which it softens and the silicon carbide reacts with the silica to produce gas, including silicon monoxide, which expands to form closed cells within the softened mass, and then cooling the softened cellular mass to a rigid body.

3. A method according to claim 2, wherein the temperature is raised from about 2900° F. to about 3250° F. in a period of not over about 15 minutes.

4. A method according to claim 2, wherein the temperature is maintained at about 3250° F. for about 5 to 15 minutes.

5. A method according to claim 2, wherein the temperature is raised from about 2900° F. to about 3250° F. in a period of not over about 15 minutes and wherein the temperature is maintained at about 3250° F. for about 5 to 15 minutes.

6. A method of making a cellular silica body containing regularly distributed uniform closed cells, which comprises preparing a homogeneous mixture of 100 parts of finely divided silica, 2.0 to 4.5 parts of finely divided high $K_2O$ feldspar and 0.05 to 0.25 part of carbon black, heating said mixture to a temperature and for a time sufficient to cause the major part of the carbon black to react with part of the silica to form silicon carbide but below that temperature at which the mixture softens appreciably, thereafter heating the mixture to a higher temperature at which it softens to form a vitreous gas-impervious mass and for a period of time sufficient to cause the silicon carbide to react with the silica to produce gas which expands to form regularly distributed uniform closed cells within the softened mass of silica, and then cooling the cellulated silica to form a rigid body.

7. A method of making a cellular silica body containing regularly distributed uniform closed cells, which comprises preparing a homogeneous mixture of 100 parts of finely divided commercially pure silica, 2.0 to 4.5 parts of finely divided high $K_2O$ feldspar and 0.05 to 0.25 part of carbon black, heating said mixture to a temperature and for a time sufficient to cause the major part of the carbon black to react with part of the silica to form silicon carbide but below that temperature at which the mixture softens appreciably; thereafter heating the mixture to a higher temperature to cause the silica to soften and form a vitreous gas-impervious mass containing the silicon carbide uniformly suspended therein and for a period of time sufficient to cause the silicon carbide to react with the silica to produce gas which expands to form regularly distributed uniform closed cells within the softened mass of silica, and then cooling the cellulated silica to form a rigid body.

8. A method of making a cellular silica body containing regularly distributed uniform closed cells, which comprises preparing a homogeneous mixture of finely divided silica, finely divided high $K_2O$ feldspar, carbon black and finely divided silicon carbide, heating said mixture to a temperature and for a time sufficient to cause the major part of the carbon black to react with part of the silica to form silicon carbide but below that temperature at which the mixture softens appreciably, thereafter heating the mixture to a higher temperature at which it softens to form a vitreous gas-impervious mass and for a period of time sufficient to cause the silicon carbide to react with the silica to produce gas which expands to form regularly distributed uniform closed cells within the softened mass of silica, and then cooling the cellulated silica to form a rigid body.

9. A method of making a cellular silica body containing regularly distributed uniform closed cells, which comprises preparing a homogeneous mixture of 100 parts of finely divided commercially pure silica, 2.0 to 4.5 parts of finely divided high $K_2O$ feldspar, 0.05 to 0.25 part of carbon black, and 0.02 to 4.0 parts of finely divided calcine in the form of silicon carbide in a glass matrix, heating said mixture to a temperature and for a time sufficient to cause the major part of the carbon black to react with part of the silica to form silicon carbide but below that temperature at which the mixture softens appreciably, thereafter heating the mixture to a higher temperature to cause the silica to soften and form a vitreous gas-impervious mass containing the silicon carbide uniformly suspended therein and for a period of time sufficient to cause the silicon carbide to react with the silica to produce gas which expands to form regularly distributed uniform closed cells within the softened mass of silica, and then cooling the cellulated silica to form a rigid body.

10. A method of making a cellular silica body containing regularly distributed uniform closed cells, which comprises preparing a homogeneous mixture of 100 parts of finely divided commercially pure silica, 2.0 to 4.5 parts of finely divided high $K_2O$ feldspar, 0.05 to 0.25 part of carbon black and 0.02 to 4.0 parts of finely divided calcine in the form of silicon carbide in a glass matrix, heating said mixture to a temperature in the range of about 2600° to about 2900° F. for a period of time sufficient to cause substantially all of the carbon black to react with part of the silica to form silicon carbide, thereafter heating the mixture to a temperature in the range of about 2800° to about 3250° F. for a period of time sufficient to cause the silica to soften and form a vitreous gas-impervious mass containing the silicon carbide uniformly suspended therein and to cause the silicon carbide to react with the silica to produce gas which expands to form regularly distributed uniform closed cells within the softened mass of silica, and then cooling the cellulated silica to form a rigid body.

11. A method of making a cellular silica body containing regularly distributed uniform closed cells, which comprises preparing a homogeneous mixture of finely divided silica, finely divided high $K_2O$ feldspar, carbon black and finely divided silicon carbide, heating said mixture to a temperature and for a time sufficient to cause the major part of the carbon black to react with part of the silica to form silicon carbide but below that temperature at which the mixture softens appreciably, thereafter heating the mixture to a higher temperature and for a period of time sufficient to cause the silica to soften and form a vitreous gas-impervious mass containing the silicon carbide uniformly suspended therein, thereafter raising the temperature of the mixture to a still higher level and for a period of time sufficient to cause the silicon carbide to react with the silica to produce gas which expands to form regularly distributed uniform closed cells within the softened mass of silica, and then cooling the cellulated silica to form a rigid body.

12. A method of making a cellular silica body containing regularly distributed uniform closed cells, which comprises preparing a homogeneous mixture of 100 parts of finely divided commercially pure silica, 2.0 to 4.5 parts of finely divided high $K_2O$ feldspar, 0.05 to 0.25 part of carbon black, and 0.02 to 4.0 parts of finely divided calcine in the form of silicon carbide in a feldspar glass matrix, heating said mixture to a temperature and for a time sufficient to cause the major part of the carbon black to react with part of the silica to form silicon carbide but below that temperature at which the mixture softens appreciably, thereafter heating the mixture to a higher temperature and for a period of time sufficient to cause the silica to soften and form a vitreous gas-impervious mass containing the silicon carbide uniformly suspended therein, thereafter raising the temperature of the mixture to a still higher level and for a period of time sufficient to cause the silicon carbide to react with the silica to produce gas which expands to form regularly distributed uniform closed cells within the softened mass of silica, and then cooling the cellulated silica to form a rigid body.

13. A method of making a cellular silica body containing regularly distributed uniform closed cells, which comprises preparing a homogeneous mixture of 100 parts of finely divided commercially pure silica, 2.0 to 4.5 parts of finely divided high $K_2O$ feldspar, 0.05 to 0.25 part of carbon black and 0.02 to 4.0 parts of finely divided silicon carbide in a feldspar glass matrix, heating said mixture to a temperature in the range of about 2600° to about 2800° F. for a period of time sufficient to cause substantially all of the carbon black to react with part of the silica to form silicon carbide, thereafter heating the mixture to a temperature in the range of about 2800° to about 2950° F. for a period of time sufficient to cause the silica to soften and form a vitreous gas-impervious mass containing the silicon carbide uniformly suspended therein, thereafter raising the temperature of the mass to about 3200° to about 3300° F. for a period of time sufficient to cause the silicon carbide to react with the silica to produce gas which expands to form regularly distributed uniform closed cells within the softened mass of silica, and then cooling the cellulated silica to form a rigid body.

14. The method according to claim 13, wherein the temperature of the mixture is maintained in the range of about 2800° to about 2950° F. for a period of time which is substantially twice that at which the mixture is maintained in the cellulating temperature range of about 3200° to about 3300° F.

15. A method of making a calcine suitable for use in producing cellular silica, which comprises heating an intimate pulverulent mixture of high $K_2O$ feldspar and carbon black in the proportions, by weight, of 90 to 99 parts of feldspar and 1 to 10 parts of carbon black at a temperature of about 2600° F. up to but not exceeding about 2920° F. for a time sufficient to cause substantially all of the carbon black to react with a part of the silica of the feldspar and convert it into silicon carbide.

16. A method of making a calcine suitable for use in producing cellular silica, which comprises heating an intimate pulverulent mixture of high $K_2O$ feldspar and carbon black in the proportions, by weight, of 90 to 99 parts of feldspar and 1 to 10 parts of carbon black, wherein the average particle size is in the range of 2 to 4 microns, at a temperature of about 2600° F. up to but not exceeding about 2920° F. for a time sufficient to cause substantially all of the carbon black to react with a part of the silica of the feldspar and convert it into silicon carbide.

17. A method of making a calcine suitable for use in producing cellular silica, which comprises grinding together a mixture of high $K_2O$ feldspar and carbon black in the proportions, by weight, of 90 to 99 parts of feldspar and 1 to 10 parts of carbon black until the average particle size of the mixture is reduced to 2 to 4 microns and heating said mixture in a non-oxidizing atmosphere at a temperature of about 2600° F. up to but not exceeding about 2920° F. for a time sufficient to cause substantially all of the carbon black to react with a part of the silica of the feldspar and convert it into silicon carbide.

18. A method according to claim 17 wherein the carbon black is lampblack having an average particle size of about 1/10 micron.

19. A calcine comprising silicon carbide having a particle size of 1 to 10 millimicrons embedded in a glass matrix produced by the method of claim 15.

20. A calcine comprising silicon carbide having a particle size of 1 to 10 millimicrons embedded in a feldspar glass matrix produced by the method of claim 16.

References Cited in the file of this patent

UNITED STATES PATENTS

| | | |
|---|---|---|
| 2,431,327 | Geiger | Nov. 25, 1947 |
| 2,544,060 | Amberg et al. | Mar. 6, 1951 |
| 2,600,525 | Ford | June 17, 1952 |
| 2,758,937 | Ford | Aug. 14, 1956 |
| 2,768,087 | Bird | Oct. 23, 1956 |